No. 640,764. Patented Jan. 9, 1900.
G. DE B. HAYES.
WEIGHING SCALE.
(Application filed Sept. 30, 1898.)
(No Model.) 2 Sheets—Sheet 2.
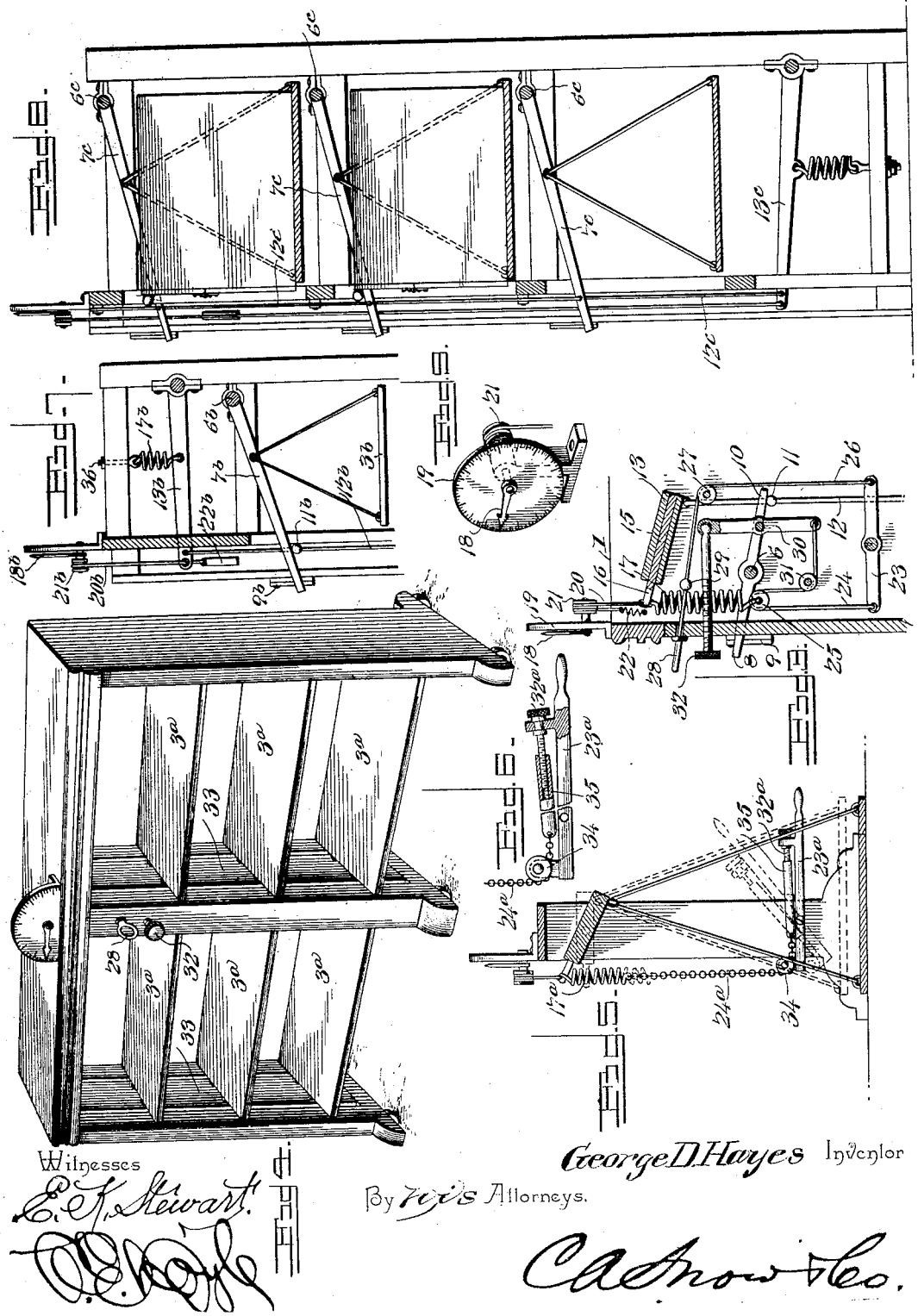
Witnesses
George D. Hayes Inventor
By his Attorneys.

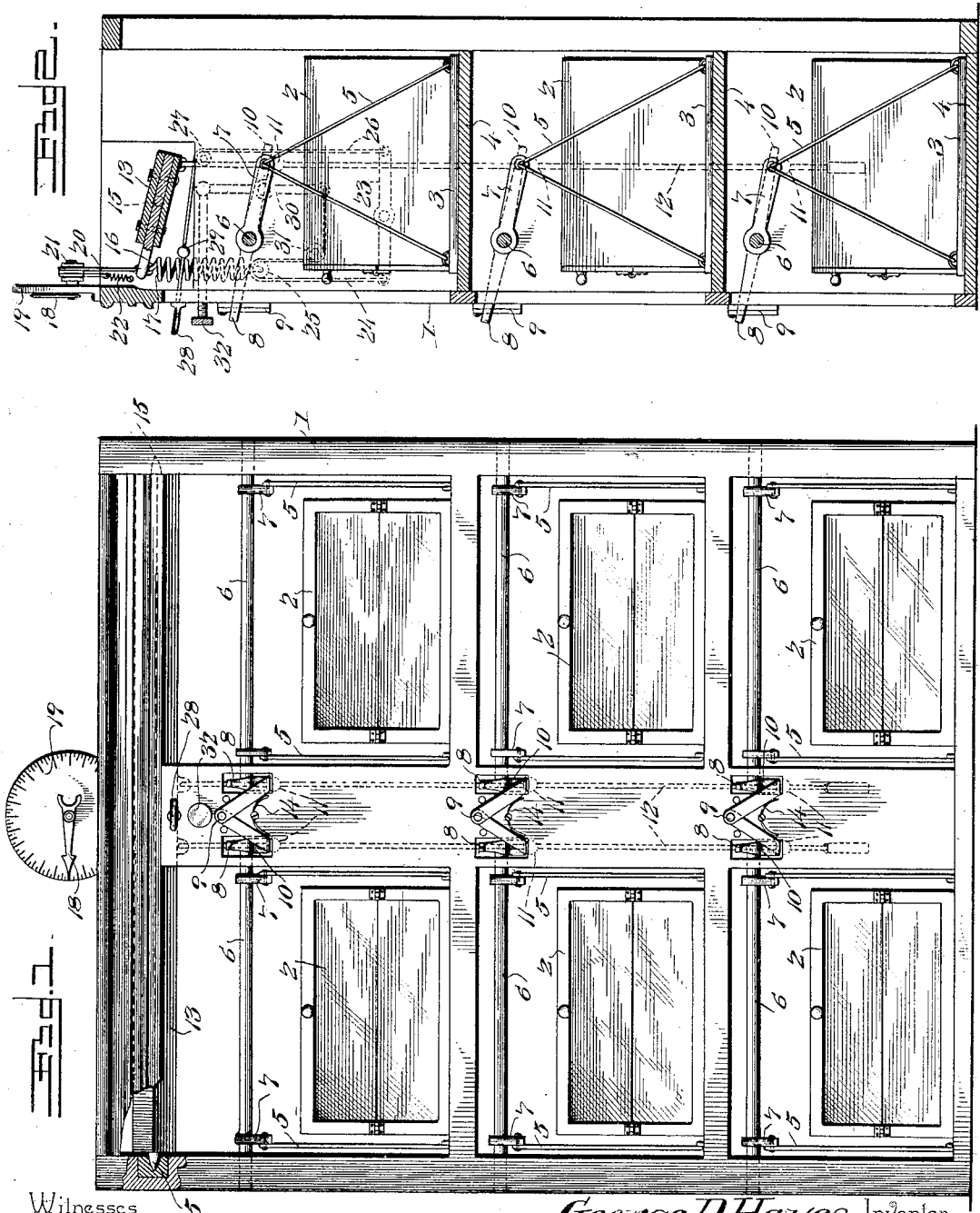

UNITED STATES PATENT OFFICE.

GEORGE DE BRETON HAYES, OF CHETEK, WISCONSIN.

WEIGHING-SCALE.

SPECIFICATION forming part of Letters Patent No. 640,764, dated January 9, 1900.

Application filed September 30, 1898. Serial No. 692,311. (No model.)

*To all whom it may concern:*

Be it known that I, GEORGE DE BRETON HAYES, a citizen of the United States, residing at Chetek, in the county of Barron and State of Wisconsin, have invented a new and useful Weighing-Scale, of which the following is a specification.

My invention relates to weighing-scales; and has for its object to provide a compact and efficient construction and arrangement of parts designed particularly for use in connection with a cabinet for containing boxes or receptacles for cakes, crackers, or other articles of merchandise which in practice are retailed from the receptacles, or, in other words, are removed gradually or in small quantities, and in the above connection to provide means whereby a quantity of merchandise introduced into or removed from a receptacle arranged in a cabinet provided with my improved weighing apparatus is indicated, to avoid the necessity of using counter or other scales for determining the amount. An apparatus of this class is particularly desirable in connection with the retail sale of cakes, crackers, pork, fish, and such articles as are received by the retailer in packages, boxes, barrels, or other receptacles.

Further objects and advantages of this invention will appear in the following description, and the novel features thereof will be particularly pointed out in the appended claims.

In the drawings, Figure 1 is a front view of a weighing apparatus constructed in accordance with my invention. Fig. 2 is a vertical sectional view of the same. Fig. 3 is a detail vertical section showing the means whereby the adjustment of the balance or scale spring is accomplished. Fig. 4 is a view in perspective of a cabinet provided with a modification of my improved weighing apparatus wherein the rock-shafts are omitted, whereby a permanent connection between all of the platforms or shelves and the indicating devices is maintained. Fig. 5 is a view of another modification particularly adapted for use in connection with pork and fish barrels. Fig. 6 is a detail view of the adjusting devices of the modification indicated in Fig. 5. Fig. 7 is a sectional detail view showing another modification of my invention. Fig. 8 is a vertical sectional view of a cabinet, showing still another modification of my invention. Fig. 9 is a detail view of a modified construction of indicating device.

Similar numerals of reference indicate corresponding parts in all the figures of the drawings.

In one embodiment of my invention, as illustrated in Figs. 1 to 3, inclusive, the casing 1 is provided with a plurality of compartments designed for the reception of boxes 2 of merchandise, the floor of each compartment consisting of a movable shelf or platform 3, which is normally supported by suitable means, such as stop-strips 4. Also each platform or shelf is supported by means of hangers 5 from a rock-shaft 6, said hangers being connected with the supporting-arms 7 of said rock-shaft and each rock-shaft being provided with a holding-arm 8, which in the construction illustrated extends to the front of the cabinet in operative relation with a catch 9. This catch may be of any suitable construction adapted for maintaining it in an adjusted position, as with an operating-arm 10, out of operative relation with the button or enlargement 11 of a connecting device 12—such as a rod, wire, cord, or chain—said connecting device being supported by a scale-beam or common rocker 13, as shown in Figs. 2 and 3. Thus each platform or shelf is supported by an independent or auxiliary rocker 6, and either or all of these independent or auxiliary rockers may be connected with the main or common rocker 13, such connection being established when the operating-arm 10 of an independent or auxiliary rocker is in engagement with the button or stop 11 of the connecting device 12. When, however, it is desired to disconnect an auxiliary rocker from the main rocker, it may be accomplished by depressing the holding-arm 8 of the rocker until engaged by the catch 9, the latter being actuated by a spring 14 and being yieldingly held by said spring with its free end in operative relation with the path of movement of the arm 8. Thus by depressing the arm 8 it will repress the catch 9, and after the arm has passed the catch the latter will return to its normal position and hold the independent or auxiliary rocker, with its operating-arm 10, out of engagement with the button or stop 11.

Said arm 10 of the rocker is preferably bifurcated to straddle the connecting device 12, whereby the positive engagement of said arm with the button or stop is insured.

The main or common rocker 13 is provided at its extremities and at intermediate points of those extremities with trunnions 15, suitably mounted in the frame of the cabinet, and at an intermediate or central point with a projection 16, with which is connected a yielding counterpoise or weighing device, such as a balance-spring 17, the tendency of said counterpoise or balance-spring being to depress the front edge of the main or common rocker, and thus elevate the rear edge thereof, to which is attached the connecting device 12, and hence elevate the front ends of the operating-arms 10 of all of those auxiliary or independent rockers which are in operative relation with said connecting device or of which, in other words, the operating-arms are in the paths of the upward movement of buttons or stops 11. For instance, if the arm 8 of one of the independent or auxiliary rockers is free or is not engaged by its coöperating catch 9 the operating-arm 10 of said rockshaft will rest upon the button or stop 11, and hence the tendency of the counterpoise or balance-spring 17 will be to elevate the connecting device 12, and hence the platform or shelf which is supported by said independent or auxiliary rocker.

In connection with the balancing mechanism above described I use indicating devices which in the construction illustrated consist of an index or pointer 18, traversing a dial 19, and the movable member of this indicating device, which in the construction illustrated in Figs. 1 to 3, inclusive, consists of the index or pointer, receives motion from the main or common rocker 13 by means of an intermediate flexible connection 20, attached at one end to said rocker, traversing a pulley 21, and having its other end attached to a yielding tension device, such as a spring 22. It will be seen that the movable member of the indicating device may be turned manually to arrange the same in different positions with relation to the other member, without affecting the positions of the connected parts of the apparatus, by simply turning the pulley 21 in the coil of the connection 20, by which said pulley is embraced; but the tension device, consisting of the spring 22, is adapted to hold the connection sufficiently taut to communicate the slightest variation of motion in the rocker 13 to the movable member of the indicating device, whereby any variation of weight upon a platform or shelf which is connected with the main or common rocker is indicated to the observer.

As hereinbefore described, I have provided means whereby only one of a plurality of supports for receptacles may be connected with the weighing mechanism, as by locking all of the independent or auxiliary rock-shafts, with the exception of one, in an inoperative position by means of their holding-arms 8 and catches 9; but I have also found in practice that it is desirable to relieve the counterpoise or balance-spring of all strain when the apparatus is not in use, and hence I employ means in connection with the balance-spring for applying tension, to a definite extent, to the spring when the weighing apparatus is to be used, said means being normally inoperative. In the drawings I have shown a preferred embodiment of this construction wherein a rocking lever 23 has one of its arms connected with one extremity of a wire, cord, or chain 24, extanding over a pulley 25, attached to the balance-spring, the other extremity of said wire, cord, or chain being more or less permanently fixed in position, and it is obvious that by moving the rocking lever 23 the balance-spring may be more or less extended to apply the desired tension thereto or to relieve it entirely of strain. Connected with the other arm of said rocking lever 23 is an operating cord or chain 26, traversing a direction-pulley 27 and terminating, preferably, outside of the cabinet in a handhold, such as a ring or grip 28, and said operating cord or chain 26 is provided with a stop 29 for contact with a suitable fixed stop arranged in the path thereof and consisting in the construction illustrated of the front wall of the cabinet. Hence by grasping the ring 28 and drawing forwardly thereon the movement of the rocking lever 23 will be limited by the contact of the movable stop 29 with the fixed stop, consisting of the front wall of the casing, and when the motion of the lever 23 is thus checked the balance-spring 17 will be under that tension desired for weighing the contents of a receptacle supported by one of the platforms or shelves. In other words, I have provided means for throwing the balance-spring into and out of operative condition, the amount of tension applied to the spring when in operation being controlled by positive means employed for stopping the movement of the rocking lever 23. Therefore when it is desired to weigh the contents of a receptacle the platform or shelf by which that receptacle is supported should be thrown into connection with the main rocker by means of the independent or auxiliary rockers and the catches, as hereinbefore described, whereupon the forward movement of the ring 28 necessary to bring the stop 29 into contact with the front wall of the cabinet will apply the weight of said receptacle to the main rocker, and the weight will be indicated by means of the pointer by reference to the graduated dial.

As the weight of the contents of a receptacle is increased or diminished the position of the main or common rocker varies, assuming that a uniform tension of the balance-spring is maintained, until the position of said main rocker will depart considerably from a horizontal plane, or a plane perpendicular to the application of strain by the connection 12, and I have found in practice that this departure from a position perpendicular to the direction of application of weight detracts materially from the accuracy of the weighing operation. Therefore I have provided for varying the tension of the balance-spring by employing tension-regulating devices consisting of a lever 30, which may be arranged in an approximately upright position in the casing, with one of its arms attached to the cord or chain 24 after passing over the pulley 25 and around a direction-pulley 31, and connecting with the other arm of said lever 30 an adjusting or tension screw 32, threaded in a suitable fixed object, such as the front wall of the casing, and adapted to be turned by the operator from a point exteriorly of the cabinet. The importance of this feature of my improved construction will be apparent when the following explanation of the operation of the device is consulted.

Assuming that with a given adjustment of the parts of the apparatus the weight of a receptacle upon one of the platforms or shelves is just sufficient, when said platform or shelf is supported by the main or common rocker, to hold the index or pointer of the indicating device at zero of the dial, if a quantity of material is removed from said receptacle the lightening of the platform will be indicated in pounds and fractions thereof by the movement of the index or pointer, and by this means goods may be retailed directly from the receptacle or original package without requiring counter or other auxiliary scales. Obviously, if a quantity of merchandise is introduced into the receptacle the index or pointer will indicate the same. When, however, the contents of the receptacle have been removed to a considerable extent, and the front end of the main or common rocker, due to the lightening of the platform, has been depressed considerably by reason of the tension of the balance-spring 17, the communication of motion from the platform to the main or common rocker will be less direct, and it is desirable to return the parts of the indicating device to the zero-mark. This is accomplished by turning the tension or feed screw 32 until the tension upon the balance-spring is reduced sufficiently to allow the main or common rocker 13 to return to its horizontal position, whereupon the weighing operation may be continued with the same accuracy as with the first adjustment of the parts. Obviously a corresponding but reversed adjustment is necessary when the weight in the receptacle has been increased to elevate the front edge of the main or common rocker considerably above a horizontal plane. Under these circumstances it is necessary to increase the tension of the balance-spring to return the main or common rocker to an operative position.

While in the construction above described the movable member of the indicating device consists of the index or pointer, it will be understood that the dial may constitute the movable member of the indicating device, as shown in Fig. 9, and that in order to secure a desired relation between the fixed and movable members of the indicating device the movable member may be turned manually and independently of the other parts of the apparatus—as, for instance, to cause the index or pointer to register with the zero-mark or with a given graduation of the dial.

In Fig. 4 I have illustrated a form of my invention wherein all of the platforms $3^a$ are connected with the weighing mechanism by means of side slides 33, and in Figs. 5 and 6 I have shown another modification of my invention adapted for use in connection with pork and fish barrels, the essential features thereof being identical with those hereinbefore described, except in so far as the means of adjustment are concerned, and these being similar in function to those illustrated in Figs. 1 to 3, inclusive. In said Figs. 5 and 6 the flexible connection $24^a$ between the balance-spring $17^a$ and the shifting-lever $23^a$ traverses a direction-pulley 34 on said lever and is attached to a tubular member 35 of the tension device, said tubular member being engaged by a feed-screw $32^a$, mounted upon the lever $23^a$. In this construction the shifting of the mechanism to an operative position is accomplished by throwing the lever $23^a$ from the position indicated in full lines to that indicated in dotted lines in Fig. 5, the balance-spring being loose or not under tension when the lever is as shown in full lines. Also to vary the tension of the spring in order to insure the adjustment of the pointer of the indicating device at the desired point of the dial the feed-screw $32^a$ must be turned to adjust the connection $24^a$.

Also in Fig. 7 I have illustrated another modification, substantially similar to the construction shown in Figs. 1 to 3, inclusive, in that it includes platforms $3^b$, supported by independent or auxiliary rockers $6^b$; but in said modified construction the supporting-arms $7^b$ are extended for engagement with the buttons or stops $11^b$ on the connection $12^b$, and the front extremities of said arms $7^b$ are arranged in operative relation with the catches $9^b$. In this modified construction illustrated in Fig. 7 the connection $12^b$ is attached at its upper end to a rocker or scale beam $13^b$, which performs the function of the main or common rocker 13, described in connection with Figs. 1 to 3, inclusive, and connected with said scale-beam $13^b$ is a balance-spring $17^b$, of which the tension may be adjusted by means of a securing-bolt 36. Also connected with the front end of the scale-beam $13^b$ is a cord, chain, or other device $20^b$, extending over a pulley $21^b$ on the spindle of the index or pointer $18^b$ and having at its other end a counterbalance consisting of a weight $22^b$.

In Fig. 8 is shown another modification embodying the essential features of the form illustrated in Figs. 1 to 3, inclusive, and the form illustrated in Fig. 7, the only difference of importance consisting in the arrangement of the rocker or scale beam 13ᶜ near the bottom of the cabinet, instead of at the top, and a separate flexible connection 12ᶜ being employed between each supporting-arm 7ᶜ and the scale-beam, said supporting-arms having rock-shafts 6ᶜ.

Various changes in the form, proportion, and the minor details of construction may be resorted to without departing from the spirit or sacrificing any of the advantages of this invention.

Having described my invention, what I claim is—

1. In a weighing apparatus, the combination of a balance-spring, a weight-holding device connected with one end of the spring, an indicating device, means connected with the other end of the balance-spring for applying tension thereto, said means having a free movement from one limit of its motion to the other and having a constant length of movement, and separate means for varying the tension thus contributed.

2. In a weighing apparatus, the combination of a balance-spring, a weight-holding device connected with one end of the spring, an indicating device, a manually-movable grip, connections between the grip and the other end of the balance-spring, said connections having spaced stops for limiting the movement of the grip in opposite directions; where, when the grip is in its normal position, the balance-spring is free from tension, or is inactive, and when the grip is in its adjusted position, at the other end of its throw, the spring is under weighing tension, to adapt the spring to be subjected to weighing tension only during the operation of weighing and separate means for varying the tension of the balance-spring, substantially as specified.

3. In a weighing apparatus, the combination with a platform, a balance-spring, connections between the platform and the balance-spring, including a rocker, and an indicating device operatively connected with the rocker, of a rocking lever having an attached flexible connection traversing a guide-pulley carried by said balance-spring, and means in connection with said lever for holding the same in the desired position, substantially as specified.

4. In a weighing apparatus, the combination with a platform, a balance-spring, connections between the platform and the balance-spring, including a rocker, and an indicating device operatively connected with the rocker, of a lever having attached thereto a flexible connection traversing a guide-pulley carried by the balance-spring, and means, for varying the position of said rocking lever, including a movable member having a limited movement, substantially as specified.

5. In a weighing apparatus, the combination with a platform, a balance-spring, connections between the platform and the balance-spring, including a rocker, and an indicating device operatively connected with the rocker, of a lever having attached thereto a flexible connection traversing a guide-pulley carried by the balance-spring, and means, for varying the position of said rocking lever, including a grip connected with said lever, and means for limiting the movement of said grip, substantially as specified.

6. In a weighing apparatus, the combination with a platform, a balance-spring, connections between the platform and the balance-spring, including a rocker, and an indicating device operatively connected with the rocker, of a lever having attached thereto a flexible connection traversing a guide-pulley carried by the balance-spring, and means, for varying the position of said rocking lever, including a flexible connection attached at one end to said lever and provided at the opposite end with a grip or handle, and a stop carried by said flexible connection for contact with a fixed object to limit the movement of the lever, substantially as specified.

7. In a weighing apparatus, the combination with a platform, a balance-spring, connections between the platform and the balance-spring, and an indicating device for registering the movements of the platform in opposition to the tension of the balance-spring, of a flexible connection traversing a guide at one end of the balance-spring, movable means connected with one end of said connection for holding the same in a fixed position during the operation of the weighing apparatus, and having a limited throw, and adjustable means connected with the other end of said connection, for maintaining the latter in a fixed position, whereby when said movable means are at one limit of their throw, the balance-spring is maintained under tension to support an object upon the platform, substantially as specified.

8. In a weighing apparatus, the combination with a platform, a balance-spring, connections between the platform and the balance-spring, and an indicating device for registering the movements of the platform in opposition to the tension of the balance-spring, of a flexible connection traversing a guide at one end of the spring, one end of said connection being adjustable toward and from said guide, and the other end being movable through a predetermined interval, also toward and from said guide, and adapted, when moved from the same, to apply, to the spring, a tension controlled by the adjustment of the other end of the connection, substantially as specified.

9. In a weighing apparatus, the combination with a platform, a balance-spring, connections between the platform and the balance-spring, and an indicating device for registering the movements of the platform in opposition to the tension of the balance-spring, of a flexible connection traversing a guide at one end of the balance-spring, a movable element to which one end of said connection is attached, an adjusting device operatively connected with said element, whereby the attached end of the connection may be held in a fixed position with relation to the guide, and means for moving the other end of the connection toward and from the guide through a predetermined interval to apply tension to the spring, substantially as specified.

10. In a weighing apparatus, the combination with a platform, a balance-spring, connections between the platform and the balance-spring, and an indicating device for registering the movements of the platform in opposition to the tension of the balance-spring, of a movable element having a limited throw toward and from one end of the balance-spring, and in alinement therewith, a connection between said movable element and said end of the spring, whereby when the element is in one position the spring is relieved of tension, and when the element is in its other position the spring is under weighing tension, and means, independent of the movement of said element, for varying the length of the portion of the connection between the element and the connected end of the spring, whereby more or less tension may be applied to the spring by the limited movement of said element, to compensate for variations of elasticity in the spring, substantially as specified.

11. In a weighing apparatus, the combination with a platform, a balance-spring, connections between the platform and the balance-spring, and an indicating device for registering the movements of the platform in opposition to the tension of the balance-spring, of a lever, means for adjusting said lever, a second lever, means for moving the second lever through a limited interval, and a flexible connection between said levers traversing a guide at one end of the balance-spring, substantially as specified.

12. In a weighing apparatus, the combination with a platform, a balance-spring, connections between the platform and the balance-spring, and an indicating device for registering the movements of the platform in opposition to the tension of the balance-spring, of a lever, a feed-screw connected with the lever for holding the latter at the desired adjustment, a second lever mounted for rocking movement through a limited interval, an exposed grip operatively connected with the second lever and adapted to be manually operated to tilt said lever, and a flexible connection between the levers and traversing a guide upon one end of the balance-spring, whereby, when the second lever is tilted, weighing tension is applied to the balance-spring, the degree of tension being controlled by the first-named lever, substantially as specified.

13. In a weighing apparatus, the combination of a plurality of platforms, a main rocker having a balance-spring and indicating devices connected therewith, auxiliary rockers in connection, respectively, with the platforms, a connection attached to the main rocker and having stops for engagement, respectively, with arms on the auxiliary rockers, and locking devices for securing the auxiliary rockers out of operative relation with said stops, substantially as specified.

14. In a weighing apparatus, the combination of a plurality of platforms, a main rocker having a balance-spring and indicating devices in connection therewith, auxiliary rockers respectively supporting the platforms and having a detachable connection with the main rocker, said auxiliary rockers being provided with holding-arms, and spring-actuated latches adapted for engagement with said holding-arms to maintain the auxiliary rockers out of operative relation with the main rocker, substantially as specified.

15. An automatic weighing-rack for cracker-boxes, and the like, consisting of a casing having compartments, shafts journaled in said compartments and having arms, latches for supporting the arms independently, platforms suspended from said arms for the support of the boxes, a weighing-lever, means for connecting each of said arms with the weighing-lever independently, and indicating devices in connection with the weighing-lever, substantially as specified.

16. In combination, a casing having compartments, shafts journaled in said compartments and having arms, platforms suspended from said arms, a spring-actuated weighing-lever, cords for connecting the arms of said shafts with said lever, and indicating devices in connection with the weighing-lever, substantially as specified.

17. In combination, a casing having compartments, shafts journaled in said compartments and having arms from which are suspended platforms, a weighing-lever, cords connecting the arms of said shafts with the weighing-lever, a balance-spring connected with the weighing-lever for opposing the weight of the platforms, an indicating device having a rotary member, a cord extending from the weighing-lever over a drum on the spindle of said rotary member, means for turning said drum in the opposite direction to that in which it is actuated by the cord, and a series of latches, in engagement with other arms of said shafts, for holding the shafts out of action, substantially as specified.

18. An automatic weighing rack for cracker-boxes, and the like, consisting of a casing having compartments, shafts journaled in said compartments, arms carried by the shafts, platforms suspended from said arms for the support of the boxes, a weighing-lever, a series of cords extending from said lever through a vertical series of the arms on said shafts, means for cutting out certain of the platforms, and means for indicating the weight upon a platform, substantially as specified.

19. An automatic weighing-rack for cracker-boxes, and the like, having a casing provided with compartments, shafts arranged in said compartments and having arms, platforms suspended from said arms for the support of boxes, a weighing-lever, cords depending from the weighing-lever and provided with stops located respectively in relation with arms of said shaft, means for securing said shafts with their arms out of operative relation with the stops on said cord, and indicating devices in connection with the weighing-lever, substantially as specified.

In testimony that I claim the foregoing as my own I have hereto affixed my signature in the presence of two witnesses.

GEORGE DE BRETON HAYES.

Witnesses:
 CHARLEY UPSOL,
 B. BABCOCK.